US012276952B2

(12) United States Patent
Benefield

(10) Patent No.: US 12,276,952 B2
(45) Date of Patent: Apr. 15, 2025

(54) HVAC SYSTEM AND CONTROL METHODS FOR OPERATION WITHIN A MICROGRID

(71) Applicant: Scientific Environmental Design, Inc., High Point, NC (US)

(72) Inventor: Douglas Glass Benefield, Mt. Pleasant, SC (US)

(73) Assignee: Scientific Environmental Design, Inc., High Point, NC (US)

( * ) Notice: Subject to any disclaimer, the term of this patent is extended or adjusted under 35 U.S.C. 154(b) by 0 days.

(21) Appl. No.: 17/409,724

(22) Filed: Aug. 23, 2021

(65) Prior Publication Data

US 2022/0042708 A1  Feb. 10, 2022

Related U.S. Application Data

(63) Continuation of application No. 16/282,184, filed on Feb. 21, 2019, now abandoned.

(51) Int. Cl.
G05B 15/02 (2006.01)
F24F 5/00 (2006.01)
(Continued)

(52) U.S. Cl.
CPC .......... *G05B 15/02* (2013.01); *F24F 5/0046* (2013.01); *F24F 11/65* (2018.01); *H02J 3/0075* (2020.01);
(Continued)

(58) Field of Classification Search
CPC ......... G05B 15/02; F24F 11/65; F24F 5/0046; F24F 2110/10; F24F 2140/60; H02J 3/28
See application file for complete search history.

(56) References Cited

U.S. PATENT DOCUMENTS 5,572,438 A * 11/1996 Ehlers ................. H02J 3/14
307/37
10,050,446 B2 * 8/2018 Ehlmann ............ H02J 3/381
(Continued)

OTHER PUBLICATIONS

Cvetkovic, Igor. "Modeling, Analysis and Design of Renewable Energy Nanogrid Systems". Jul. 22, 2010. Master's Thesis, Electrical Engineering, Virginia Polytechnic Institute and State University, Virginia. (Year: 2010).*
(Continued)

*Primary Examiner* — Darrin D Dunn
*Assistant Examiner* — Vi N Tran
(74) *Attorney, Agent, or Firm* — Gregory Finch; Finch Paolino, LLC

(57) ABSTRACT

An HVAC renewable energy management system and components to enable the efficient use of locally produced power from an onsite nanogrid and interconnected nanogrids of a cohesive direct current microgrid network. The system comprises a central controller for controlling one or more intermittent distributed energy resource (DER), source converter, distributed storage device, energy storage converter, power bus, internal load, and interface gateway to one or more external grid for bi-directional power control, sharing, and consumption. System hardware and software elements are configured for internetworking communication, management, control, demand side management, and power balance, using maximum power point tracking to shift power consumption, dynamic matching of local DER production, power quality assurance, system protection, power interconnection management, interface management, metering, revenue settlement, system optimization, and security. The system can match local power production with an individual household's power consumption to reduce intermittency and ultimately total microgrid consumption.

17 Claims, 11 Drawing Sheets

(51) Int. Cl.
*F24F 11/65* (2018.01)
*F24F 110/10* (2018.01)
*F24F 140/60* (2018.01)
*H02J 3/00* (2006.01)
*H02J 3/28* (2006.01)
*H02J 3/38* (2006.01)
*H02J 7/00* (2006.01)

(52) U.S. Cl.
CPC ............... *H02J 3/28* (2013.01); *H02J 3/381* (2013.01); *H02J 7/0048* (2020.01); *F24F 2110/10* (2018.01); *F24F 2140/60* (2018.01); *H02J 2300/26* (2020.01); *H02J 2300/28* (2020.01)

(56) References Cited

U.S. PATENT DOCUMENTS

| | | | | |
|---|---|---|---|---|
| 2014/0222231 A1* | 8/2014 | Kamel | ................ | G01R 21/001 705/412 |
| 2017/0329357 A1* | 11/2017 | Torres | ................ | G05D 23/1917 |
| 2018/0173264 A1* | 6/2018 | Sprinkle | ................ | G05F 1/66 |
| 2018/0191160 A1* | 7/2018 | Carr | ................ | H02J 3/381 |
| 2018/0233911 A1* | 8/2018 | Rosendahl | ................ | H02J 3/388 |

OTHER PUBLICATIONS

Burmester D, Rayudu R, Seah W, Akinyele D. "A review of nanogrid topologies and technologies". Renew Sustain Energy Rev 2017. vol. 67: pp. 760-775. (Year: 2017).*

M. Nasir, H. A. Khan, A. Hussain, L. Mateen, and N. A. Zaffar, "Solar PV-based scalable dc microgrid for rural electrification in developing regions". Jan. 2018. IEEE Trans. Sustain. Energy, vol. 9, No. 1, pp. 390-399. (Year: 2018).*

Burmester, Daniel, Ramesh Rayudu, and Winston KG Seah. "Use of maximum power point tracking signal for instantaneous management of thermostatically controlled loads in a DC nanogrid." IEEE Transactions on Smart Grid 9.6 (2017): 6140-6148. (Year: 2017).*

* cited by examiner

HVAC SYSTEM AND CONTROL METHODS FOR OPERATION WITHIN A MICROGRID

CROSS REFERENCE TO RELATED APPLICATIONS

The present application is a continuation of U.S. patent application Ser. No. 16/282,184 filed Feb. 21, 2019, the entirety of which is hereby incorporated by reference herein in its entirety.

FIELD

The present disclosure relates to the field of heating ventilation and air conditioning (HVAC) systems; particularly, a renewable energy management system for HVAC applications within a cohesive microgrid network of nanogrids.

BACKGROUND

The US electric power grid is undergoing modernization to make the grid "smart." A smart grid is an electrical power delivery system where power quality, efficiency, and energy costs are optimized by pervasive use of information and communication technology with the aim to control distributed energy resources. The next-generation smart grid technologies include battery storage, electric vehicles, dispatchable loads, and microgrids.

A microgrid is a group of interconnected loads and distributed energy resources within clearly defined electrical boundaries that acts as a single controllable entity with respect to the grid. A microgrid can connect and disconnect from the grid to enable it to operate in both grid-connected or island mode (U.S. Department of Energy Microgrid Exchange Group). It is a concept that incorporates distributed energy resources (DER), such as Photovoltaic (PV) generators and small wind turbines, as well as distributed generation (DG) and distributed storage (DS). DG units are generally small generators and DS units can be for example batteries or electric vehicles (EVs).

A nanogrid is a power distribution system for a single house or a small building, with the ability to connect or disconnect from other power entities via a gateway. It consists of local power production from a DER, generally a PV generator, powering internal loads, with the option of utilizing a DS energy storage and or an energy management control system (EMS). EMS's generally include a supply side management (SSM) and demand side management (DSM). An SSM focuses on controlling the nanogrid's supplies and energy storage to ensure that demand loads are met and at an optimal battery State of Charge (SoC), while a DSM manipulates the various internal loads to meet the characteristics of the power supply. DSM, power quality, imbalance/asymmetry, plug-and-play operation of DER systems, distributed voltage/frequency profile control, and non-autonomous/autonomous operation are some of the challenges in operating a nanogrid. However, a microgrid can be created by interconnecting nanogrids together to create a hierarchical power system that enables power sharing and communications within a diverse community of power consumers. The major components of a microgrid are a hierarchical control approach, a point of common coupling (PCC), distributed controls using local information, and a specific region that enables DG units to be integrated in a systematic way to ensure reliable operation of the system. In a smart grid, there are two way flows of electricity and information, whereby consumers and producers (e.g., utility companies) could exchange real-time information (e.g., electricity prices, power usages) through for example smart meters. A network of communication devices provides the microgrid with the necessary intelligence to allow customers and utility companies to collaboratively manage power generated, delivered, and consumed through real-time, bidirectional communications. However, a secured communication is essential in order to ensure the proper stability and operation of all the microgrid and nanogrid components.

Alternating Current (AC) systems have been dominant in power systems for more than a century, but these traditional AC systems have been affected by recent developments such as the emergence of power electronics and the increasing interest in renewable energy sources. The majority of the present residential electric appliances work with AC voltage; thus, power electronics-based systems are needed for converting the DC voltage that is generated by renewable DERs to the AC voltage. AC microgrids represent the AC power supply in a distribution network. They can be easily connected to an existing grid utility without special requirements such as converters and their control approaches. However, the loads being served by today's AC grid are becoming more natively Direct Current (DC), and DC microgrids are garneringg more focus due to better short circuit protection, lower losses, enhanced efficiency, no reactive power, the proliferation of modern electronic equipment, and the availability of environmentally friendly DC sources (solar and fuel cells). Many appliances in residential homes are operated using DC power, such as TVs, computers, DC water heaters and lighting. A heating, ventilation, and air conditioning (HVAC) system consumes a significant portion of residential power. The U.S. Energy Information Administration (EIA) estimates that 18% of annual household electricity use is for air conditioning. Three-quarters of all air-conditioned homes use central equipment (EIA, 2017) currently operating under AC power. Motor-driven components (e.g., fans) used in HVAC and refrigeration are the highest energy consumers in both the residential and commercial sectors. In the residential sector, HVAC applications account for 63% of motor-driven energy use, and refrigeration accounts for 28%. Direct-DC power systems can provide energy and cost savings in the residential built environment (including net zero energy homes), in which electricity is generated, distributed, and consumed in DC. Advanced brushless DC (permanent magnet) motors can save 5-15% of the energy used by traditional AC induction motors and up to 30-50% in variable-speed drives (VSD) applications for pumping, ventilation, refrigeration, and space cooling (K. Garbesi, V. Vossos, H. Shen, Catalog of DC Appliances and Power Systems, Lawrence Berkeley National Lab, Berkeley, CA, 2011). The majority of VSDs use the AC-DC-AC power conversion architecture; a DC power distribution can eliminate the front-end AC-DC rectifier and thereby reduce power losses, cost, weight and volume of the converter system.

An emerging paradigm of operation and control of microgrids in distribution networks is the customer driven concept. Customers install utility compatible generation sources with an enhanced energy management system (EMS) in the distribution grid. Their operation and control are then dictated by community rules and individual preferences. The rapid addition of new DER and types of microgrid and nanogrid loads make the power grid design more complex, thereby making it more time-consuming and challenging to detect, preempt, and address problems in the grid. A small-scale renewable energy system presents a challenge as an intermittent power source leads to a mismatch between power production time and the power consumption of residential loads. Most residential forced air HVAC systems in North America have varying runtimes because the system cycles on and off to meet conditioning demands. Conditioning runtimes are influenced by the temperature set on the thermostat that also allows the occupants to set the system in fan-only mode, to improve mixing, provide ventilation in systems equipped with an outdoor air intake, or maximize the amount of air that goes through the filter. Depending on the configuration of the system, the fan speed can vary under different operation modes. The addition of DER to the grid involves not only electrical connection but also forecasting, control and coordination of variable power production and demand compared to traditional bulk generation and usage. The need exists for a renewable EMS that ensures the efficient use of locally produced power to match the demands of residential cooling loads with minimal impact, and maintains the power quality of an onsite nanogrid and interconnected nanogrids of a cohesive direct current (DC) microgrid network.

SUMMARY

The following presents a simplified summary of some embodiments of the present disclosure to provide a basic understanding of the present disclosure. This summary is not an extensive overview of the present disclosure. It is not intended to identify key/critical elements of the present disclosure or to delineate the scope of the present disclosure. Its sole purpose is to present some embodiments of the present disclosure in a simplified form as a prelude to the more detailed description that is presented later.

An aspect of the present disclosure is an HVAC renewable energy management system (hereinafter "HVAC REMS") comprising systems and methods for optimal matching of local intermittent power production of a nanogrid to the power consumption of an HVAC system. The HVAC REMS comprises one or more: central controller; intermittent distributed energy resource (DER); source converter (e.g., DC-DC); Distributed Storage (DS) device; DS converter/controller; power bus; internal load (e.g., HVAC); sensing-communication line; and interface gateway to one or more external grid for bi-directional power control, sharing, and consumption. In various embodiments, the central controller is operably connected to control one or more said device, DER, source converter, DS, DS converter, power bus, internal load, and interface gateway via one or more sensing and communication lines. In various embodiments, the control method comprises the use of maximum power point tracking (MPPT) of one or more DER and measuring one or more cooling loads operating within a nanogrid or a microgrid for power flow control to dynamically match power production and consumption. In various embodiments, the one or more internal load is connected to a Direct Current (DC) power bus and powered by DC.

An aspect of the present disclosure is a HVAC REMS comprising an MPPT controller operably connected in series or parallel to one or more DER, one or more voltage converter, and at least one HVAC system, components, variable speed drive, compressor, motor, blower, fan, or cooling load. In various embodiments, the MPPT control method comprises the monitoring of one or more DER voltage and current output and modulates the duty cycle to the voltage converter to present the power requirement of said components of an HVAC system to said DER. In various embodiments, the method comprises the modulation of the converter's pulse width modulation (PWM) duty cycle by tracking one or more DER's maximum power point generation. In various embodiments, the method comprises the use of one or more sensors (e.g., current, voltage, temperature) of at least one DER to track maximum power point generation. In various embodiments, the method further comprises the use of one or more MPPT algorithms, including but not limited to, perturb and observe (P&O), incremental conductance (IncCond), open-circuit voltage, short-circuit current, fuzzy logic (FL), or neural networks (NN) for stable, precise, and rapid tracking.

An aspect of the present disclosure is a HVAC REMS comprising a central controller and one or more controllable node within a residential structure containing a nanogrid. In various embodiments, the controllable node comprises one or more voltage or current sensors to monitor power consumption of an internal load. In various embodiments, the internal load is one or more standard household appliance, HVAC system, components, variable speed drive, compressor, motor, or cooling load. In various embodiments, the controller controls the power supply of one or more said load, preferably a thermostat-controlled HVAC system or components, using one or more voltage converter. In various embodiments, the controller controls in real time the power supply of an HVAC system via one or more sensors, including but not limited to, temperature, humidity, voltage, and current, to modulate the voltage applied to the HVAC system. In various embodiments, the controller comprises one or more microcontroller operably connected to one or more DER, DS, capacitor, and switches, to communicate and control the HVAC system operating within a nanogrid. In various embodiments, the controller enables a user to determine a chosen relative humidity (RH) set-point, airflow, temperature, or the like, of a conditioned space.

An aspect of the present disclosure is an HVAC REMS comprising power sharing, smart metering, communication between utilities and customers, two or more households, two or more nanogrids, and information technologies for an advanced, secured, optimal control and protection of a microgrid further comprising an internetwork of at least two nanogrids. In various embodiments, two or more nanogrid are interconnected through one or more DC power bus line and disconnected with one or more DC breaker. In various embodiments, a nanogrid comprises a bipolar DC-link configuration, including but not limited to, between ground and 380 V. In various embodiments, at least two nanogrids are connected via one more communication network, including but not limited to a wireless LAN, WAN, or cellular network, via network controllers using at least one communication protocol, including but not limited to TCP/IP. In various embodiments, two or more households can negotiate, exchange, provide, receive or store power within a community DS system, preferably a DS system comprising one or more battery, capacitor, supercapacitor, or the like, based on a microgrid rule or policy. In various embodiments, two or more households can negotiate, exchange, provide, or receive power from a utility or external power distributor, based on a microgrid rule or policy. In various embodiments, two or more households can negotiate, exchange, provide, or receive power from one another based on a microgrid rule or policy. In various embodiments, two or more nanogrids can communicate using said HVAC REMS to coordinate power consumption.

An aspect of the present disclosure is an HVAC REMS comprising a system and methods for the efficient use of DER power within a microgrid by matching the power consumption of one or more HVAC system, components, variable speed drive, compressor, motor, blower, fan, or cooling load operating within at least two nanogrids and local DER production. In various embodiments, the method comprises the monitoring of one or more MPPT tracking signals of one or more DER to determine power availability. In various embodiments, the method comprises one or more said MPPT algorithms to control the duty cycle of one or more converters to alter voltage delivered to one or more HVAC loads. In various embodiments, the method determines and adjusts the duty cycle of each load in comparison to all loads within the microgrid based on set-point, temperature, humidity, and usage time. In various embodiments, the method comprises providing power priority to the highest load. In various embodiments, the duty cycle is adjusted by a load priority ratio to the total available power of a microgrid. In various embodiments, the matched consumption hierarchical power system is coordinated through an HVAC REMS microgrid architecture.

An aspect of the present disclosure is an HVAC REMS architecture comprising one or more physical exchange layer, converter controller, microgrid controller, gateway controller, home energy management system (HEM), communication network, cloud server, and cloud server applications. In various embodiments, the physical exchange layer comprises one or more bi-directional DC-DC converters. In various embodiments, one or more nanogrid comprises a DC-DC controller for handling communication with the physical layer DC-DC converter. In various embodiments, the cloud server applications include but are not limited to one or more applications for storing data, measurements, visualization of power flow, debugging, maintenance, monitoring, data analysis, demand side management, power balance, power quality assurance, system protection, system optimization, and security. In various embodiments, one or more remote client device can access cloud server and application for management, seamless integration, and efficient operation of DC renewable generation, DC energy storage systems, and DC smart cooling loads.

Specific embodiments of the present disclosure provide for a system for energy management comprising an HVAC system comprising a compressor, a motor, a blower, and a variable speed drive, the HVAC system being operable to generate a cooling load; a distributed energy resource comprising a solar panel; a voltage converter operably engaged with the distributed energy resource; a controller operably engaged with the distributed energy resource, the voltage converter, and the HVAC system, the controller comprising a processor and a non-transitory computer-readable medium having instructions stored thereon to cause the processor to perform one or more actions, the one or more actions comprising monitoring a voltage and current output of the distributed energy resource; measuring power consumption of the cooling load of the HVAC system; modulating a duty cycle of the voltage converter; and, dynamically establishing a power flow between the distributed energy resource and the HVAC system according to the voltage and current output and the power consumption of the cooling load.

Further specific embodiments of the present disclosure provide for a method for energy management comprising monitoring, with a controller operably engaged with at least one current, voltage, or temperature sensor, a voltage and current output of a distributed energy resource; measuring, with the controller operably engaged with at least one current, voltage, or temperature sensor, a power consumption of an internal energy load, the internal energy load comprising a cooling load of an HVAC system; modulating, with the controller, a duty cycle of a voltage converter, the voltage converter being operably engaged with the distributed energy resource and the HVAC system; establishing, with the controller being operably engaged with the voltage converter, a power flow between the distributed energy resource and the HVAC system according to the voltage and current output and the power consumption of the cooling load; and, establishing, with the controller being operably engaged with the voltage converter, a power flow between the distributed energy resource and a distributed energy storage device according to the voltage and current output and the power consumption of the cooling load, the distributed energy storage device comprising a nanogrid.

Still further specific embodiments of the present disclosure provide for a method for renewable energy management comprising monitoring a tracking signal of a distributed energy resource operating within a microgrid, the microgrid comprising at least two nanogrids; measuring a power consumption of an internal energy load within the at least two nanogrids, the internal energy load comprising an energy load of an HVAC system; modulating a duty cycle of a voltage converter according to the internal energy load and a load priority parameter within the microgrid; and, establishing a power flow between the distributed energy resource and the at least two nanogrids according to the internal energy load and the load priority parameter.

The foregoing has outlined rather broadly the more pertinent and important features of the present disclosure so that the detailed description of the present disclosure that follows may be better understood and so that the present contribution to the art can be more fully appreciated. Additional features of the present disclosure will be described hereinafter which form the subject of the claims of the present disclosure. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the present disclosure as set forth in the appended claims.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Figure 1:
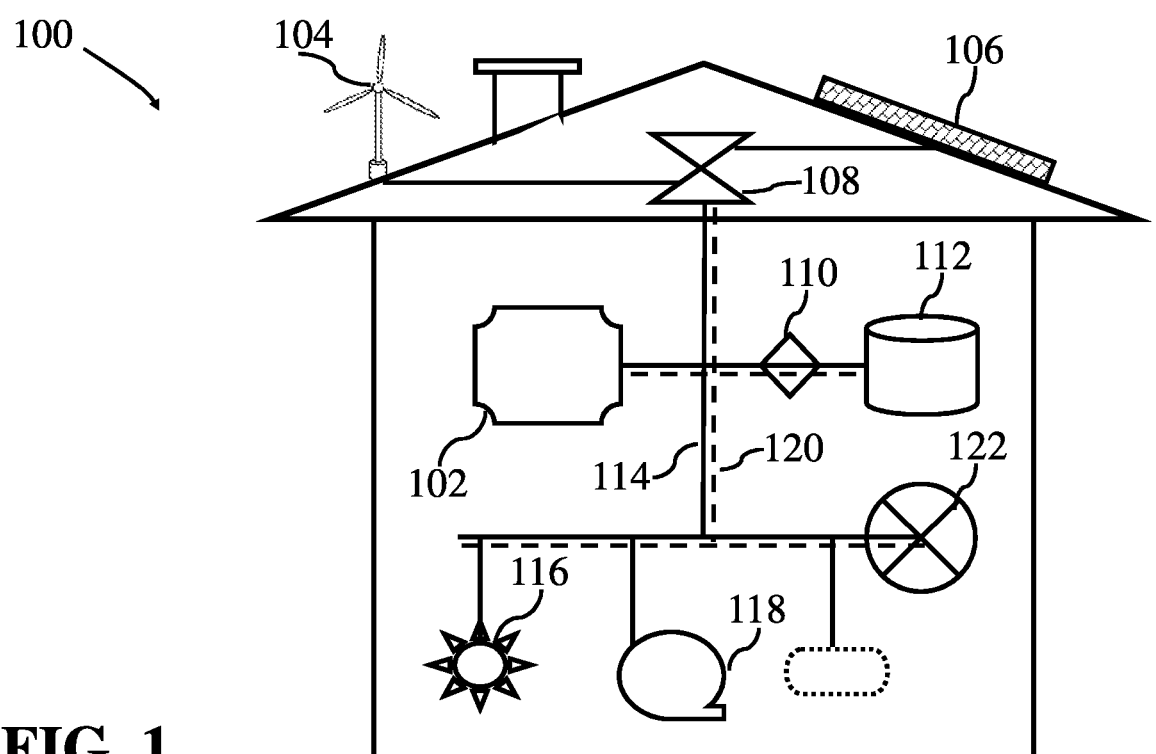
FIG. 1 is an illustration of an HVAC renewable energy management platform, according to an embodiment of the present disclosure.

Exemplary embodiments are described herein to provide a detailed description of the present disclosure. Variations of these embodiments will be apparent to those of skill in the art. Moreover, certain terminology is used in the following description for convenience only and is not limiting. For example, the words "right," "left," "top," "bottom," "upper," "lower," "inner" and "outer" designate directions in the drawings to which reference is made. The word "a" is defined to mean "at least one." The terminology includes the words above specifically mentioned, derivatives thereof, and words of similar import. Like reference numbers refer to like elements throughout.

As used herein the term "HVAC" includes systems providing both heating and cooling, heating only, cooling only, as well as systems that provide other occupant comfort and/or conditioning functionality such as humidification, dehumidification, and ventilation.

As used herein the term "residential" when referring to an HVAC system means a type of HVAC system that is suitable to heat, cool and/or otherwise condition the interior of a building that is primarily used as a single-family, a duplex, apartment, office, retail structure or dwelling.

Without loss of generality, some descriptions further herein below will refer to an exemplary scenario in which the innovation is used in a home or housing environment. However, it is to be appreciated that the described embodiments are not so limited and are applicable to use of such innovation in multiple types and locations of HVAC systems.

A small-scale renewable energy system presents a challenge as an intermittent power source leads to a mismatch between power production time and the power consumption of residential loads such as an HVAC system. Embodiments of the present disclosure enable an HVAC renewable energy management system (herein after "HVAC REMS") and components that ensure the efficient use of locally produced power from an onsite nanogrid and interconnected nanogrids of a cohesive direct current (DC) microgrid network. The HVAC REMS comprises a central controller for controlling one or more intermittent Distributed Energy Resource (DER), source converter (e.g., DC-DC), Distributed Storage (DS) device, DS converter, power bus, internal load (e.g., DC-based HVAC), and interface gateway to one or more external grid for bi-directional power control, sharing, and consumption. The HVAC REMS and various system hardware and software elements are configured for internetworking communication (e.g., Internet, cloud services, etc.), management, control, demand side management, power balance, using maximum power point tracking (MPPT) to shift power consumption, dynamic matching of local DER production, power quality assurance, system protection, power interconnection management, interface management, metering, revenue settlement, system optimization, and security. The system can match local power production with an individual household's power consumption to reduce intermittency and ultimately total microgrid consumption.

Referring to FIG. 1, an illustration 100 of an HVAC renewable energy management platform is shown, according to various embodiments. The HVAC REMS comprises a central controller 102, one or more intermittent distributed energy resource (DER) 104, 106, source converter 108, DS converter/controller 110, Distributed Storage (DS) device 112, power bus 114, one or more internal loads (e.g., HVAC) 116, 118, one or more sensing communication line 120, and interface gateway 122 to one or more external grid for bi-directional power control, sharing, and consumption. In various embodiments, DER 104 comprises one or more wind turbine, preferably a small-scale wind turbine, having a non-limiting rated capacity (e.g., 300-1000 W), and capable of providing one or more voltage output (e.g., 12, 24, 48V, etc.). In various embodiments, DER 106 comprises one or more photovoltaic module, having a non-limiting rated capacity (e.g., 200-500 W), and capable of providing one or more voltage output (e.g., 30 to 40 V). In various embodiments, source converter 108 comprises a DC-DC converter capable of converting one or more source voltages from at least one said DER to a DV bus voltage level of 380 V. In various embodiments, DS device 112 comprises one or more energy storage device, including but not limited to a battery, a capacitor, a supercapacitor, a fly-wheel, a battery of an electric vehicle, or combinations thereof. In various embodiments, DS converter/controller 110 comprises a bi-directional controller, capable of sensing one or more voltage level of a DS, and controlling the charging or discharging of said DS. In various embodiments, power bus 114 comprises a DC power bus, preferably a power bus operating at a voltage, including but not limited to, a voltage level of 380 V. In various embodiments, one or more internal loads are connected to power bus 114, and powered at one or more voltage level, including but not limited to, 12 V, 24 V, or 48 V via one or more load converter designed for said various voltage level. In various embodiments, the one or more internal load comprises an HVAC system, further comprising one or more internal loads, optionally operating under variable frequency drive (VSD), including but not limited to a compressor, fan, and a blower. In various embodiments, gateway 122 comprises a bi-directional converter (e.g. DC-AC) for interfacing with one or more external grid, including a nanogrid, a microgrid, or a national grid. In various embodiments, the central controller is operably connected to control one or more said device, DER, source converter, DS, DS converter, power bus, internal load, and interface gateway via one or more sensing and communication line 120. In various embodiments, the control method comprises the use of maximum power point tracking (MPPT) of one or more DER 104, 106 and measuring one or more cooling loads 118 operating within a nanogrid or a microgrid for power flow control to dynamically match power production and consumption.

Figure 2:
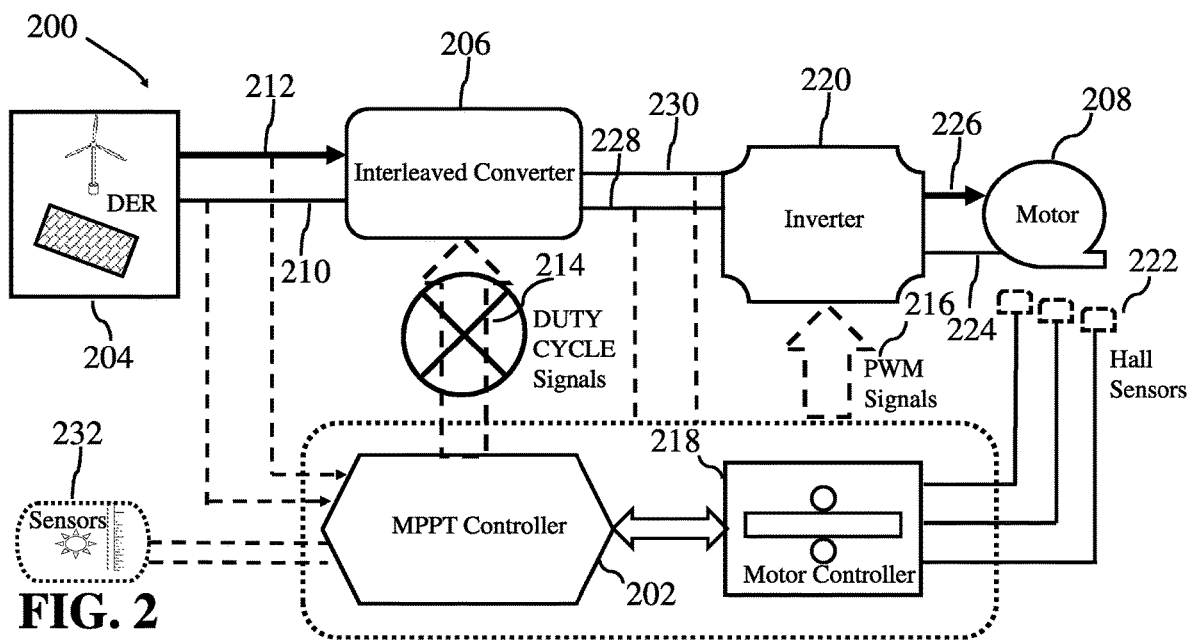
FIG. 2 is an illustration of an MPPT controller architecture for operating an HVAC load, according to an embodiment of the present disclosure.

Referring to FIG. 2, an illustration 200 of an MPPT controller architecture for operating an HVAC load is shown, according to various embodiments. The MPPT controller architecture comprises an MPPT controller 202 operably connected in series or parallel to one or more DER 204, one or more voltage converter, preferably an interleaved converter 206, and at least one HVAC system, components, variable speed drive, compressor, motor 208, blower, fan, or cooling load. In various embodiments, the MPPT controller 202 monitors (shown as dotted connections) one or more DER voltage 210 and current output 212 and modulates the duty cycle signals 214 to the interleaved converter 206 to present the power requirement of said components, motor 208, of an HVAC system to said DER. In various embodiments, the method comprises the modulation of the converter's pulse width modulation (PWM) duty cycle, via one or more PWM signals 216 by tracking one or more DER's maximum power point generation, generating one or more said signals via a motor controller 218. The PMW signals 216 are generated and sent to an inverter 220, converting DC power from the interleaved converter to AC for actuating motor 208 in conjunction with one or more Hall sensor 222, one or more voltage signal 224 and current signal 226. In various embodiments, MPPT controller 202 modulates the PWM signals 216 by sensing one or more voltage signal 228 and current signal 230 of interleaved converter 206. In various embodiments, the architecture comprises one or more motor 208, including but not limited to an inductance motor, AC motor, commutated motor, DC motor, BLDC motor, magnetic motor, PMDC motor, or the like. Depending on the type of AC or DC powered motor 208 chosen, the MPPT and motor controllers may operate with or without inverter 220. In various embodiments, the architecture comprises a motor 208 configured to operate under variable frequency control (VFD), as a variable speed drive (VSD). In various embodiment, the VFD or VSD comprises one or more speed control methods, including but not limited to scalar, vector, direct torque control, the like, or combinations thereof. In various embodiments, motor 208 or the like is incorporated into one or more HVAC system or components, including but not limited to air handling unit, cooling tower fan, cooling tower pump, circulating pump, compressor, fan, blower, damper, or the like. In various embodiments, the MPPT controller 202 comprises the use of one or more sensor 232 (e.g., current, voltage, temperature) of at least one DER 204 to track maximum power point generation. In various embodiments, motor controller 218 comprises a speed controller and a limiter. In various embodiments, the PWM signals are fed into one or more power driver, incorporating one or more Insulated Gate Bipolar Transistors (IGBT) within inverter 220 for actuating motor 208. In various embodiments, the MPPT controller 202 executes one or more algorithm, including but not limited to, constant voltage control (CVC), perturb and observe (P&O), hill climbing (H&C), incremental conductance (IncCond), open-circuit voltage, short-circuit current, fuzzy logic (FL), or neural networks (NN) for stable, precise, and rapid tracking.

Figure 3:
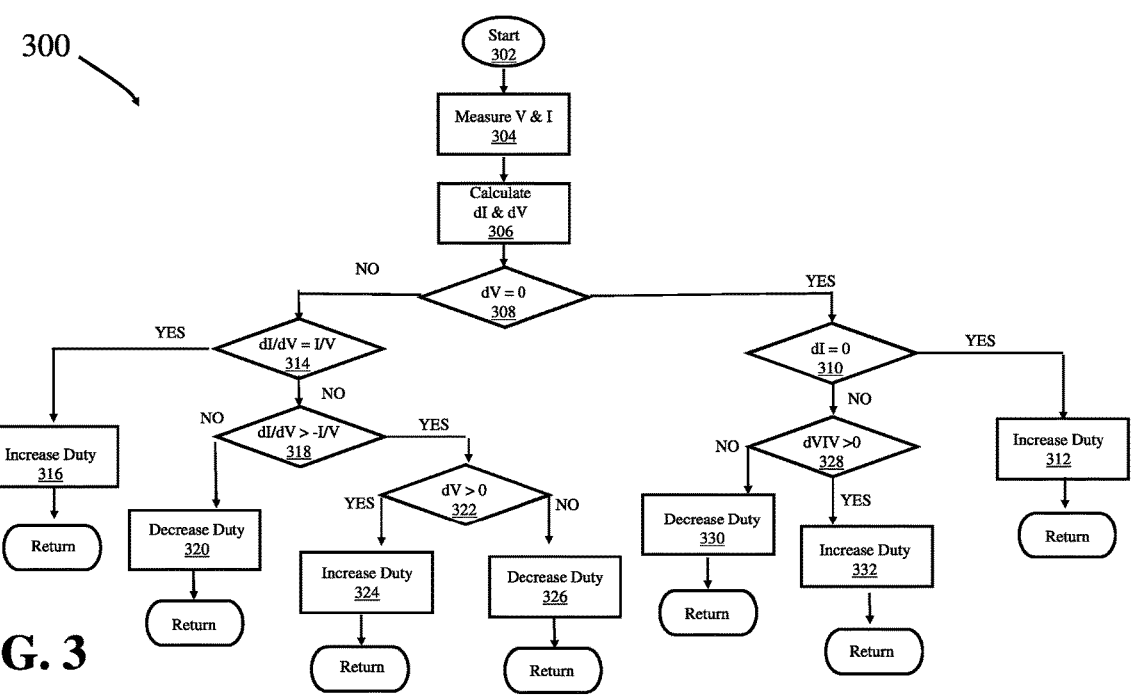
FIG. 3 is a logic flow diagram illustrating a process algorithm for implementation by an MPPT controller, according to an embodiment of the present disclosure.

FIG. 3 is a logic flow diagram 300 illustrating a process algorithm for implementation by an MPPT controller, according to various embodiments. The MPPT algorithm is based on the premise that for any environmental condition, for example, the specific solar irradiance/ambient temperature affecting a PV module 106, there exists one operating point for maximum power extraction. In various embodiments, the MPPT controller algorithm comprises the monitoring of one or more PV output voltage and current (e.g., 210, 212) and alters the duty cycle (e.g., 214) to the DC-DC converter (e.g., 206) to present the PV system with required impedance. The DC-DC converter forces the PV module to operate at its maximum power point (MPP) by presenting a variable load to the PV. In a preferred embodiment, the incremental conductance (IncCond) is chosen due to its high yield, producing more energy, under vastly changing conditions and its lower oscillations. IncCond is based on the observation of the P-V characteristic curve. The MMP can be calculated using the relation between dI/dV and −I/V. If dP/dV is negative then MPPT lies on the right side of a recent position, and if the MPP is positive, then the MPPT is on the left side. The MPP is reached when dP/PV. If dP/dV is negative or positive, the duty cycle needs to be altered to ensure the value is returned to zero. The algorithm comprises a starting step (302) that proceeds to measure V & I (step 304) of a DER, preferable a PV, and a calculation of dI and dV (step 306). Decision point is made at step 308 on whether dV is equal to zero (0) or not. If dV is equal to zero, then the algorithm proceeds to determine (step 310) whether dI is equal to zero or not. If dI is equal to zero then the duty cycle of the converter is increased (step 312). The algorithm then repeats starting at step 302 (labeled as Return). Continuing with the alternative at step 308, if dV does not equal zero, then dI/V is determined (step 314) to be equal or not equal to UV. If dI/dV is equal, then the duty cycle is increased at step 316 and the algorithm then repeats starting at step 302 (labeled as Return). If dI/dV is not equal to UV at step 314, the dI/dV is determined (step 318) whether it is greater than −I/V. If it is NO, then the duty cycle is decreased at step 320 and the algorithm then repeats starting at step 302 (labeled as Return). If YES at 318, then dV is determined (step 322) to be greater or not than zero. If YES, the duty cycle is increased at step 324 and the algorithm then repeats starting at step 302 (labeled as Return). If NO at step 322, then the duty cycle is decreased at step 326 and the algorithm then repeats starting at step 302 (labeled as Return). Continuing with the alternative step at 310, if dI is not equal to zero, then a determination is made whether it is greater or not than zero (step 328). If it is NO, then the duty cycle is decreased at step 330 and the algorithm then repeats starting at step 302 (labeled as Return). If YES, then the duty cycle is increased at step 332 and the algorithm then repeats starting at step 302 (labeled as Return). In various embodiments, the said IncCond algorithm can be implemented using one or more IC on a microcontroller, microprocessor, the like, or combinations thereof.

Figure 4:
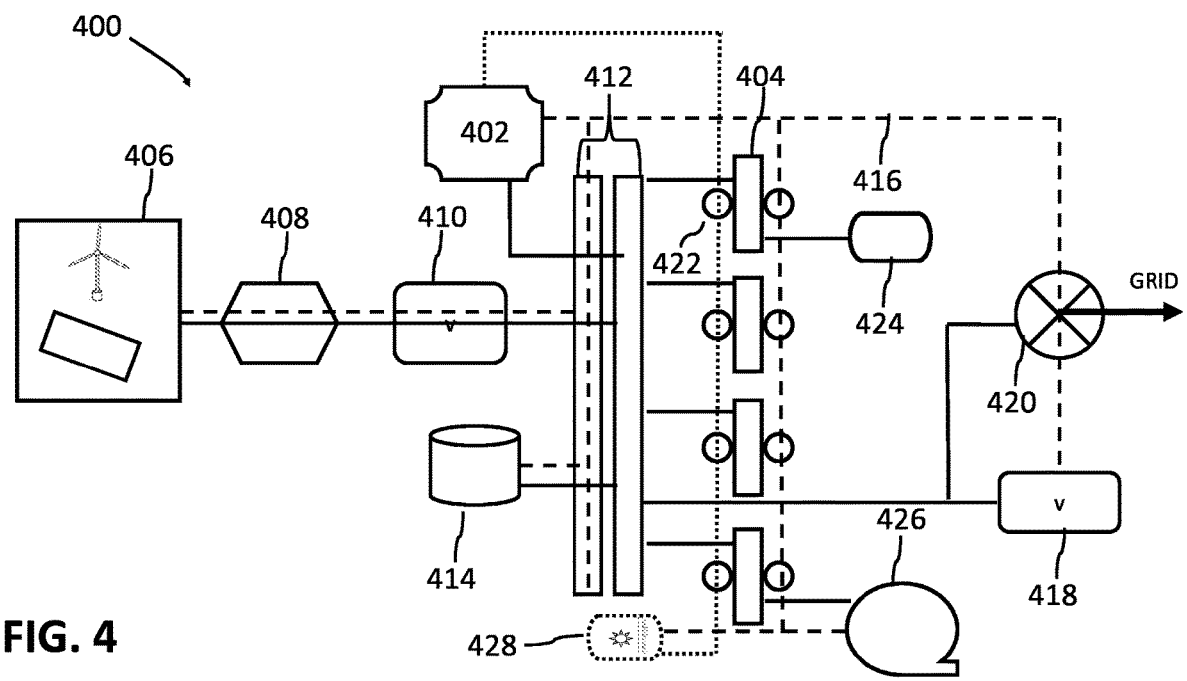
FIG. 4 is a diagram of a nanogrid control architecture of the HVAC renewable energy management platform, according to an embodiment of the present disclosure.

Referring to FIG. 4, a diagram 400 of a nanogrid control architecture of the HVAC REMS is shown, according to various embodiments. The HVAC REMS comprises a central controller 402 and one or more controllable electrical node 404 within a residential structure containing a nanogrid. The nanogrid comprises a DER 406, implementing an MPPT controller 408, and power conversion with voltage controller 410, providing a voltage source for one or more internal power source node 404, via a DC bus 412. The nanogrid further comprises a DS 414 for power storage connected to said DC bus 412 to provide backup power to at least one electrical node 404. In various embodiments, the controller 402 comprises one or more control connection 416 (dotted line) for control communication to the DER 406, MPPT controller 408, voltage converter 410, bus line 412, DS 414, gateway converter 418, and gateway interface 420. In various embodiments, the one or more said nanogrid components are powered by the DC power bus 412. In various embodiments, a controllable node 404 comprises one or more voltage or current sensor 422 to monitor power consumption of an internal load 424. In various embodiments, the internal load is one or more standard household appliance. In various embodiments, the internal load comprises a HVAC system 426, components, variable speed drive, compressor, motor, or cooling load. In various embodiments, the controller 402 controls the power supply of one or more said load, using one more voltage converter 410, preferably a constant voltage controller. In various embodiments, the controller 402 controls in real time the power supply of an HVAC system via one or more sensors 422, including but not limited to temperature, humidity, voltage, and current, to modulate the voltage applied to the HVAC system 426. In various embodiments, sensors 422 may operate in conjunction with a thermostat 428 or as a component of a thermostat. In various embodiments, the controller comprises one or more microcontroller, operably connected to one or more DER, DS, capacitor, switches, to communicate and control the HVAC system operating within a nanogrid. In various embodiments, the controller enables a user to determine a chosen relative humidity (RH) set-point, airflow, temperature, or the like, of a conditioned space.

Figure 5:
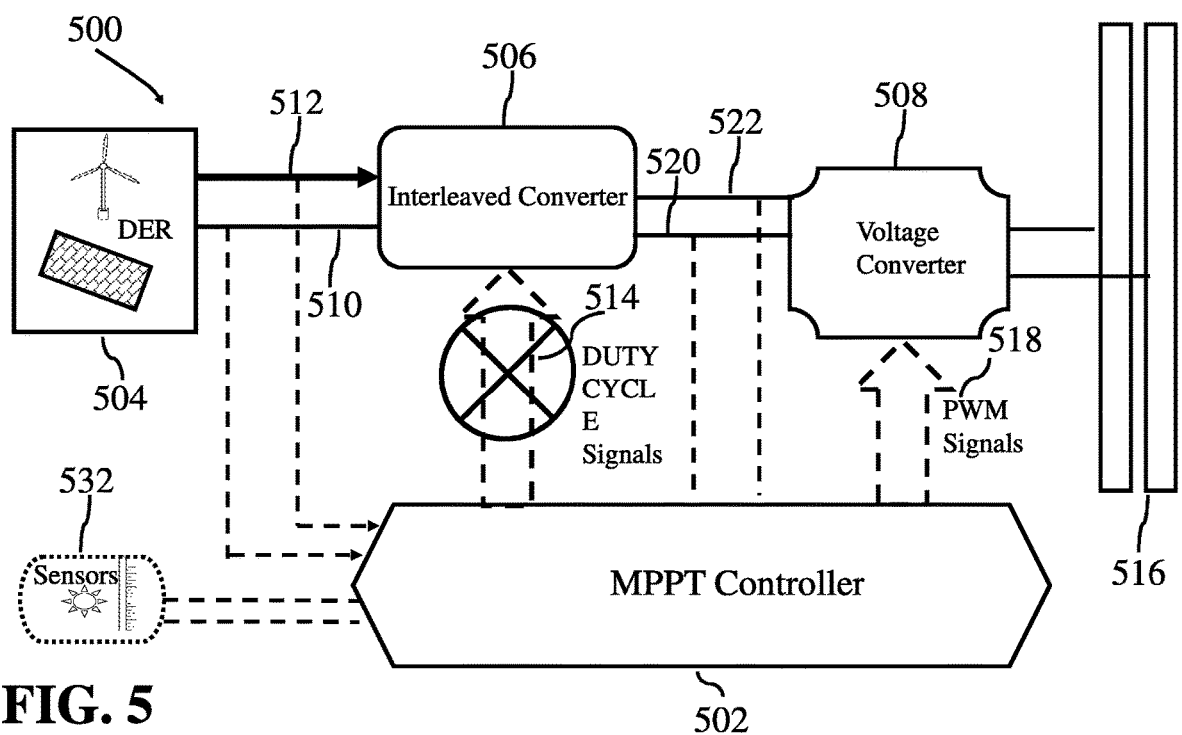
FIG. 5 is an illustration of an MPPT controller architecture for providing constant voltage to a DC bus of a nanogrid, according to an embodiment of the present disclosure.

Referring to FIG. 5, an illustration 500 of an MPPT controller architecture for providing constant voltage to a DC bus of a nanogrid is shown, according to various embodiments. The MPPT controller architecture comprises an MPPT controller 502 operably connected to, in series or parallel to, one or more DER 504, one or more voltage converter, preferably an interleaved converter 506, at least one voltage converter 508, and a power bus 510, providing power to one or more said electronically controllable nodes of FIG. 4. In various embodiments, the MPPT controller 502 monitors (shown as dotted connections) one or more DER voltage 510 and current output 512 and modulates the duty cycle signals 514 to the interleaved converter 506 to present the power requirement of bus 516. In various embodiments, the method comprises the modulation of the converter's pulse width modulation (PWM) duty cycle, via one or more PWM signals 518 by tracking one or more DER's maximum power point generation, generating one or more said signals to voltage converter 508. The PMW signals 518 are generated and sent to converter 508, converting DC power from the interleaved converter to one or more voltage level for power bus 510. In various embodiments, MPPT controller 502 modulates the PWM signals 518 by sensing one or more voltage signal 520 and current signal 522 of interleaved converter 506. In various embodiments, voltage converter 508 is preferably one or more, but not limited to, a buck converter, a synchronous buck converter, enabling the system to output a constant voltage (380V) to DC bus 516. In various embodiments, the voltage converter comprises, including but not limited to, one or more control FET, gate driver, PWM generator, synchronizing FET, inductor, capacitor, compensation network, amplifier, error amplifier, or combinations thereof. In various embodiments, the voltage-mode control and voltage-mode error amplifier can be stabilized using one or more PI or PID type compensator, depending on the chosen electrolytic capacitor, tantalum capacitor, or high-performance POS-cap, SP-Cap output capacitors. In an alternative embodiment, voltage converter 508 comprises a digitally controlled DC-DC buck converter performed by field-programmable gate array (FPGA) circuitry. The voltage and current-mode control are based on a voltage control oscillator (VCO) performed measurements regarding output-voltage and inductor current digital-counters to obtain integral values for the output voltage and inductor current. In various embodiments, one or more instantaneous inductor current-value-measurement is used for the switching action. When the VCO is used for the inductor current measurement, the integral is measured during the switching-on time set as an observation interval and the switching action occurs based on this measurement. In various embodiments, this principle enables full digitalization of the voltage- and current-control loop and also the used measurement principle is capable of rejecting the switching disturbances during current and voltage measurements. In various embodiments, all the tasks for the current and voltage control is implemented within FPGA amplifiers, a voltage-mode control, and a voltage error amplifier.

Figure 6:
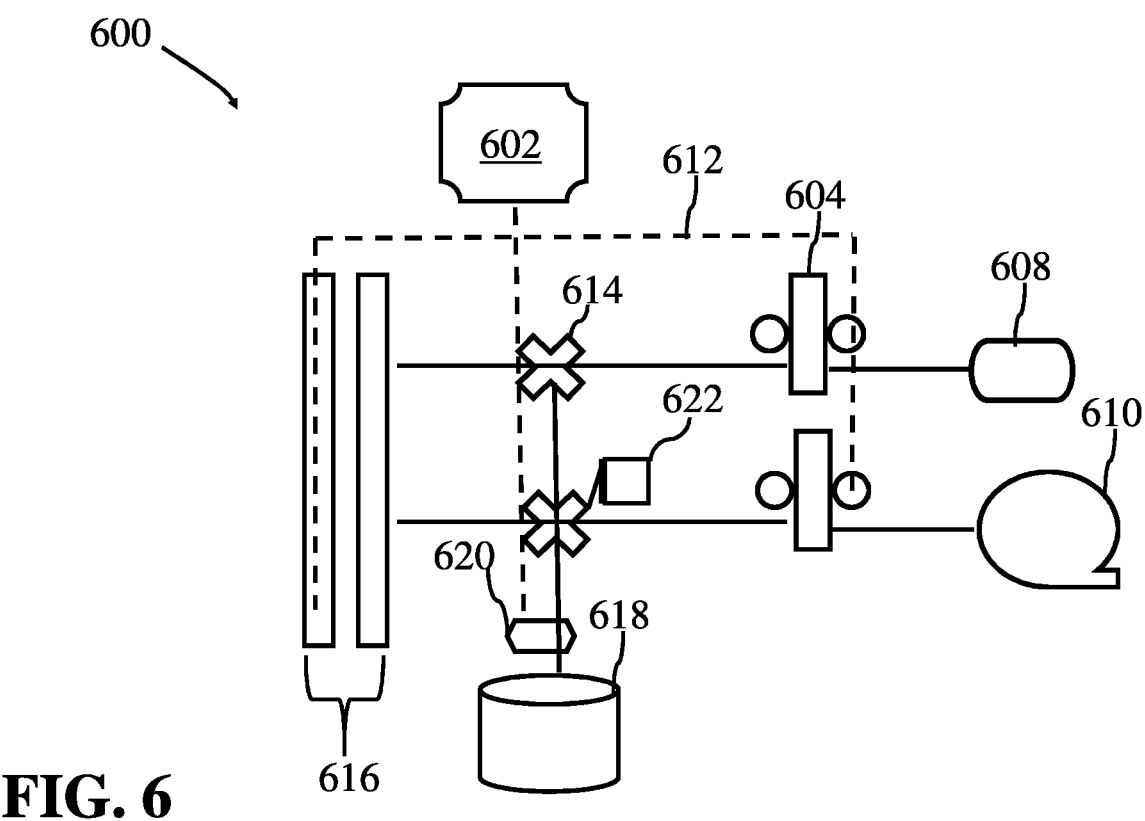
FIG. 6 is a block diagram of an electrical node system control architecture for a nanogrid supporting the operation of a HVAC system, according to an embodiment of the present disclosure.

Referring to FIG. 6, a block diagram 600 of an electrical node system control architecture for a nanogrid supporting the operation of a HVAC system is shown, according to various embodiments. The system control architecture comprises a central controller 602 and multiple control node 604 providing power to one or more DC load 608, 610 of the present disclosure. In various embodiments, one or more node 604 are capable of current and voltage sensing applied to load 608, 610. In various embodiments, the controller 602 controls one or more components of the architecture through one or more communication channel 612 (shown as dotted lines). In various embodiments, the system control architecture comprises one or more switch 614 connecting one or more node 604 to DC bus 616. In various embodiments, the system control architecture comprises one or more backup energy storage device 618 connected to one or more switch 614 or DC bus 616 via a DS controller 620. In various embodiments, one or more switch 614 is controlled by one or more microcontroller 622 and monitors one or more current and voltage of storage device 618 and one or more node 604 sensor outputs. For example, microcontroller 622 monitors the voltage level of storage device 618. If the voltage level drops below a specified level, due to leakage current or load activity, a charge switch 614 is activated to restore voltage to an adequate level. In various embodiments, the microcontroller executes one or more algorithms using these outputs for control decision-making. In various embodiments, the microcontroller sends and receives information to/from the central controller 602 relaying one or more load 608, 610 status and implementing control for power management.

Figure 7:
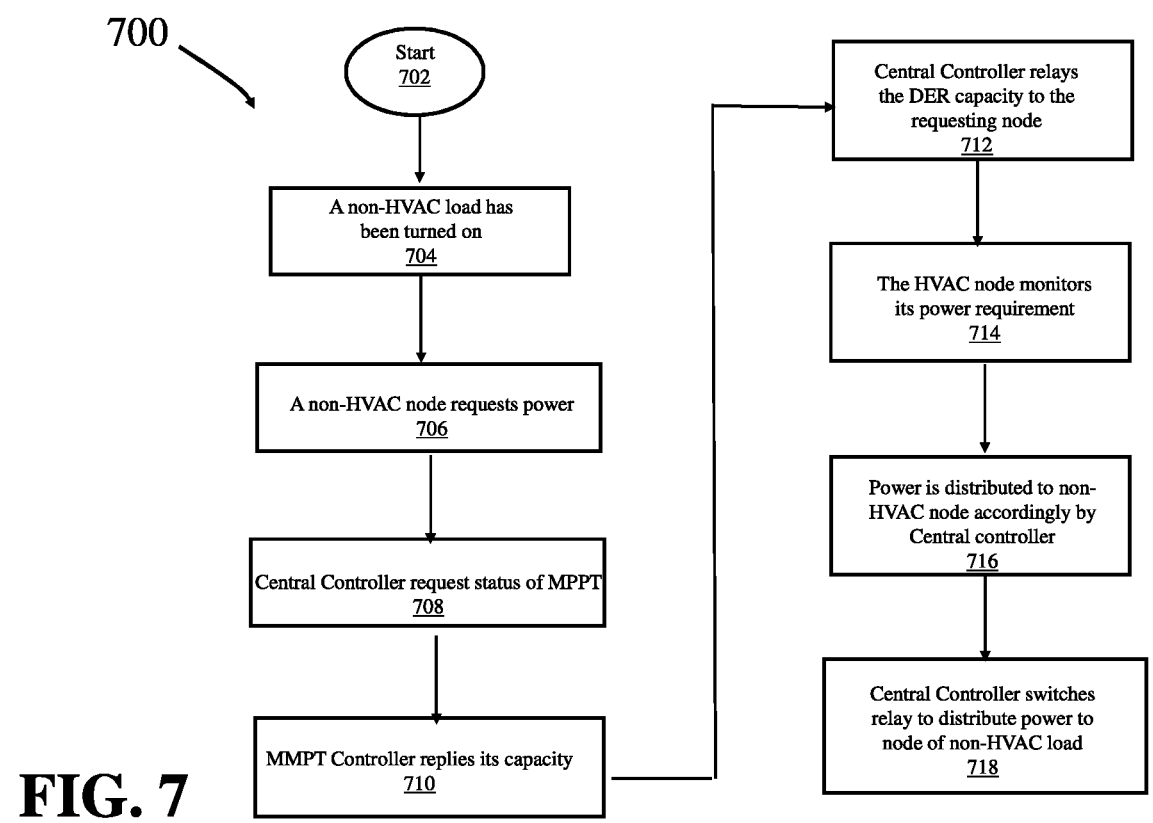
FIG. 7 is a logic flow diagram illustrating a process for power management of an HVAC load within a nanogrid, according to an embodiment of the present disclosure.

FIG. 7 is a logic flow diagram 700 illustrating a process for power management of an HVAC load within a nanogrid, according to various embodiments. The process is based on the premise that for any nanogrid load condition the HVAC load has priority over a non-HVAC load. The process comprises a starting step (702) that proceeds to determine (step 704) that a non-HVAC load 608 has been turned on. An electric node 604 then requests (step 706) power. The central controller 602 then requests (step 708) the status of the MPPT controller 502 for the available capacity of one or more DER 504. The MPPT controller replies (step 710). The central controller 602 then relays (step 712) the available capacity to the requesting node. The node of the HVAC system monitors (step 714) its power requirement. If there is sufficient capacity, then the central controller 602 distributes (step 716) to the node powering a non-HVAC load. In a final step, the central controller 602 switches (step 718) one or more relay switch 614 to distribute power to a node 604 of a non-HVAC load.

Figure 8:
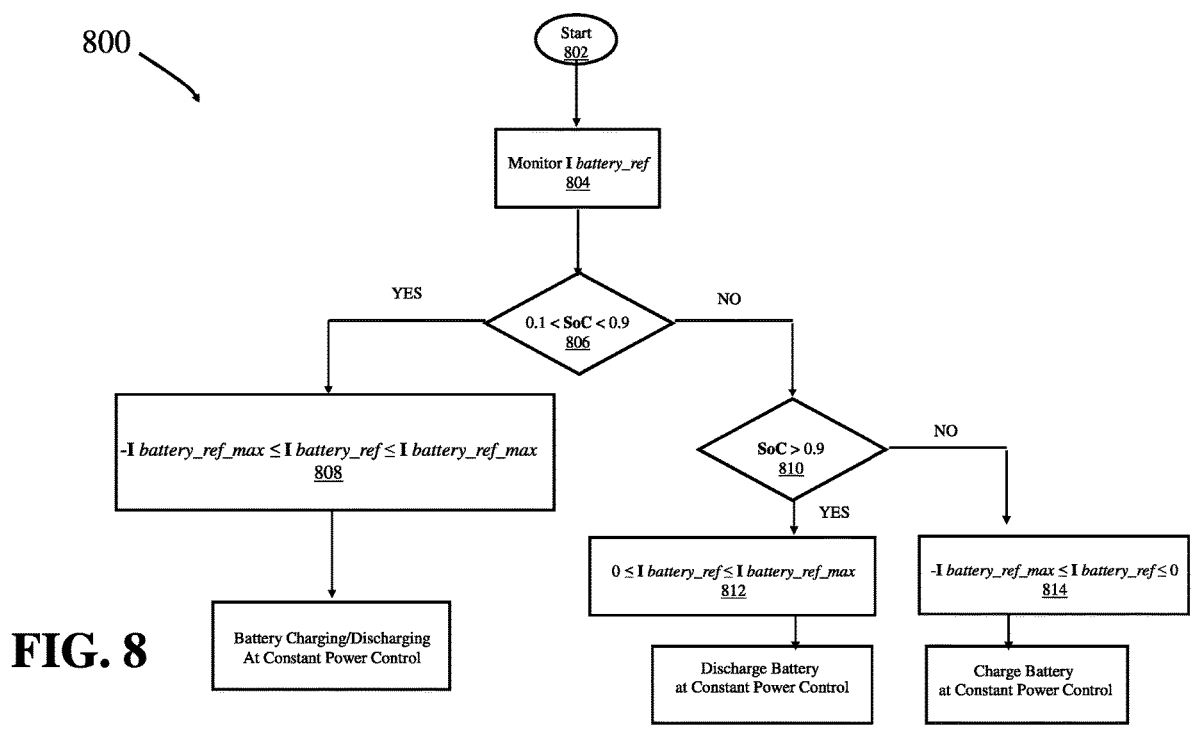
FIG. 8 is a logic flow diagram illustrating a process for power capacity management of a distributed storage source supporting an HVAC system within a nanogrid, according to an embodiment of the present disclosure.

FIG. 8 is a logic flow diagram 800 illustrating a process for power capacity management of a distributed storage source (e.g., device 618) supporting an HVAC system within a nanogrid, according to various embodiments. The premise of the process is to measure a DS's State of Charge (SoC) to monitor the operation of a battery when it's charging or discharging. In a preferred embodiment, the control of device 618 comprises one or more limit protection methods using one or more value or range of SoC. In various embodiments, the energy storage system receives one or more power command from central controller 602 for managing one or more fluctuation of an output of one or more DER, preferably a PV module. In various embodiments, the sum of the difference between a Power (load) and Power (PV) and one or more command Power (EMS-schedule) are sent as input into device 618 via controller 620. In various embodiments, frequency division is conducted on the sum in order to retrieve its low frequency components. In various embodiments, the low frequency component of a Power (battery-ref) will be managed by the storage device 618 to prevent frequent battery charging/discharging. In various embodiments, a reference output current of the battery (i.e., Current (I) battery-ref) is derived from the Power (battery_ref). In various embodiments, the charging or discharging of device 618 can be determined by measuring the real-time SoC of device 618. The process comprises a starting step (802) that proceeds to monitor (step 804) I battery-ref. At step 806, a decision is made whether Soc is between 0.1 and 0.9 or not. When SoC is between the said limits, the device 618 can work at charging/discharging mode normally. A limiting protection is required to avoid the battery charging/discharging. The limited range is set (step 808) as −I battery_ref_max≤I battery_ref≤I battery_ref_max where I battery_ref_max is the upper limit and −I battery_ref_max is the lower limit. Device 618 is discharging when I battery_ref≤0 and s charging I battery_ref≤0. At step 810, if SOC≥0.9, then the SoC value of device 618 exceeds the safe operation range. Device 618 is only permitted to work in discharging mode. A limiting protection is required (step 812) to implement and comprise the range set as 0≤I battery_ref≤I battery_ref_max. When SoC is 0.1, then the SoC value of device 618 operating (step 814) below the safe operation range. Device 618 is only permitted to work at charging mode. A limiting protection is required to avoid the battery device from discharging and the range is set as −I battery_ref_max≤I batter_ref≤0.

Figure 9:
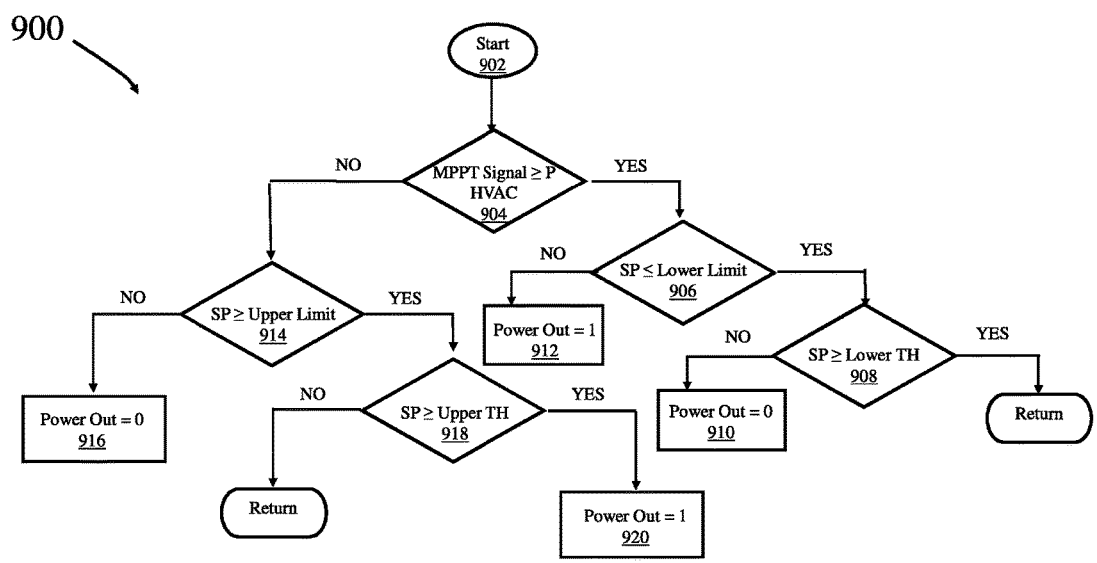
FIG. 9 is a logic flow diagram illustrating a process for controlling an HVAC system within a nanogrid, according to an embodiment of the present disclosure.

FIG. 9 is a logic flow diagram 900 illustrating a process for controlling an HVAC system within a nanogrid, according to various embodiments. The premise of the process is the control of the frequency of on/off cycles of the HVAC system depending on the availability of PV power and reducing the frequency of "on" time while PV power is off-line. In various embodiments, controller 602 controls one or more node 604, supplying at least one HVAC system or component, by establishing one or more set-point (e.g. temperature threshold) lower temperature thresholds and limits received, for example from a thermostat, and powering the HVAC unit to its lower limit when PV power is available and allowing the temperature to vary between a lower threshold and one or more limit. When insufficient PV power is present, the temperature of a conditioned space can be increased to an upper limit and allow oscillation between its upper threshold and limit. The process comprises a starting step (902) that proceeds to determine (step 904) whether the MPPT signal is greater than or equal to the power required for operating an HVAC system. If it is YES, then one or more set-point (SP) (e.g., temperature), is determined (step 906) whether to be equal to or less than a specified Lower Limit. If YES, then the SP is determined (step 908) whether to be equal to or greater than a Lower Threshold (TH). If YES, then the process repeats starting at step 902 (labeled as Return). If NO, then the Power out is set (step 910) to zero. At step 906, a power out is set (step 912) to 1 (full) if a NO decision is made. At step 904, a NO decision proceeds to step 914 where another determination is made whether the SP is equal to or greater than an Upper Limit. If NO, then a power out is set (step 916) equal to 0. If YES, then another determination is made (step 918) of whether the SP is equal or greater than an Upper TH. If YES, then a power out is set (step 920) to Full (1). If NO, then the process repeats starting at step 902 (labeled as Return).

Figure 10:
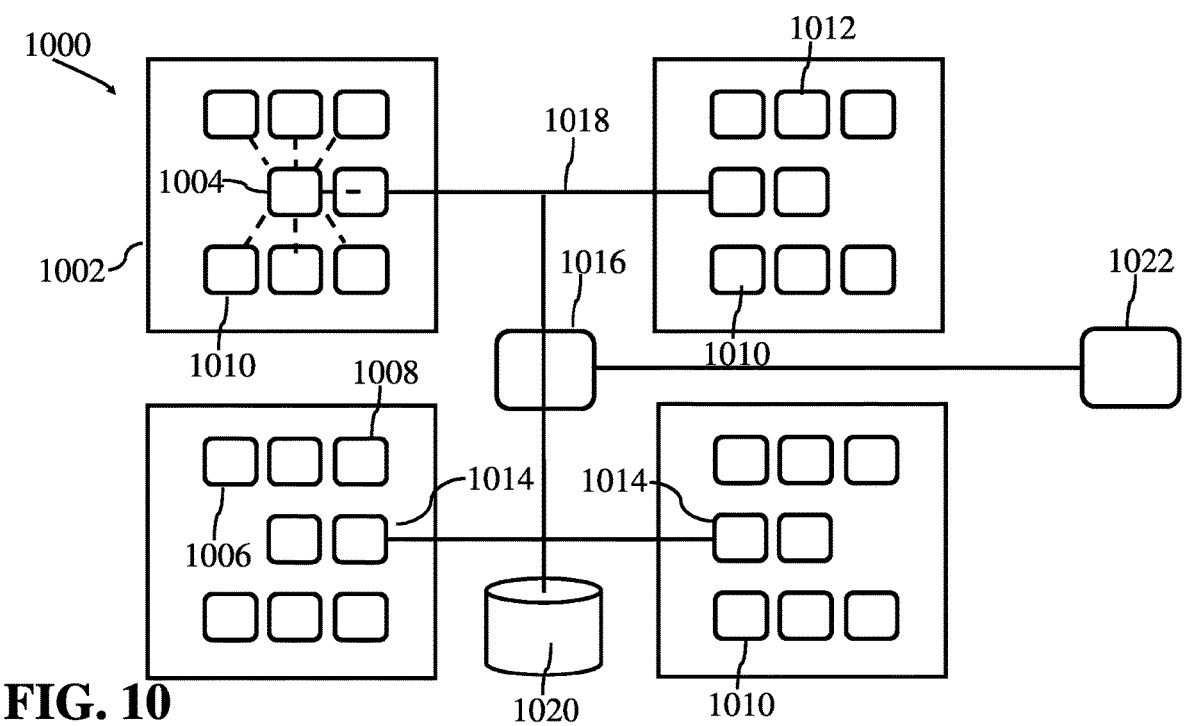
FIG. 10 is a block diagram of a microgrid architecture supporting the operation of a HVAC renewable energy management system, according to an embodiment of the present disclosure.

FIG. 10 is a block diagram 1000 of a microgrid architecture supporting the operation of a HVAC REMS, according to various embodiments. The HVAC REMS comprises multiple individual nanogrids located with one or more residential structure 1002 (shown with identical elements for illustration purposes). Each residential structure comprises a nanogrid further comprising at least one nanogrid controller 1004, DER 1006, DS 1008, internal load 1010 (e.g., DC HVAC system), smart meter 1012, and gateway 1014. In various embodiments, two or more nanogrids of two or more residential structure 1002 enable power sharing, smart metering, communication between utilities and customers, and two or more households. In various embodiments, two or more nanogrids comprise information technologies for an advanced, secured, optimal control and protection of a microgrid 1016. In various embodiments, the two or more nanogrids are interconnected through one or more DC power bus line 1018 and disconnected with one or more DC breaker. In various embodiments, a nanogrid within residential structure 1002 comprises a bipolar DC-link configuration, including but not limited to, between ground and 380 V. In various embodiments, at least two nanogrids are connected via one more communication network, including but not limited to a wireless LAN, WAN, cellular network, via network controllers using at least one communication protocol, including but not limited to TCP/IP. In various embodiments, two or more households can negotiate, exchange, provide, receive or store power within a community DS system 1020, preferably a DS system comprising one or more battery, capacitor, supercapacitor, or the like, based on a microgrid rule or policy. In various embodiments, two or more households can negotiate, exchange, provide, or receive power from a utility or external power distributor, based on a microgrid rule or policy, via one or more grid 1022. In various embodiments, two or more households can negotiate, exchange, provide, or receive power from one another based on a microgrid rule or policy. In various embodiments, two or more nanogrids can communicate using said HVAC REMS to coordinate power consumption.

In various embodiments, the method of coordinating power consumption comprises the monitoring of one or more MPPT tracking signals of one or more DER 1006 to determine power availability. In various embodiments, the method comprises one or more said MPPT algorithms to control the duty cycle of one or more converters to alter voltage delivered to one or more HVAC loads 1010. In various embodiments, the method determines and adjusts the duty cycle of each load in comparison to all loads within the microgrid based on set-point, temperature, humidity, and usage time. In various embodiments, the method comprises providing power priority to the highest load. In various embodiments, the duty cycle is adjusted by a load priority ratio to the total available power of a microgrid. In various embodiments, the matched consumption hierarchical power system is coordinated through said HVAC REMS microgrid architecture.

Figure 11:
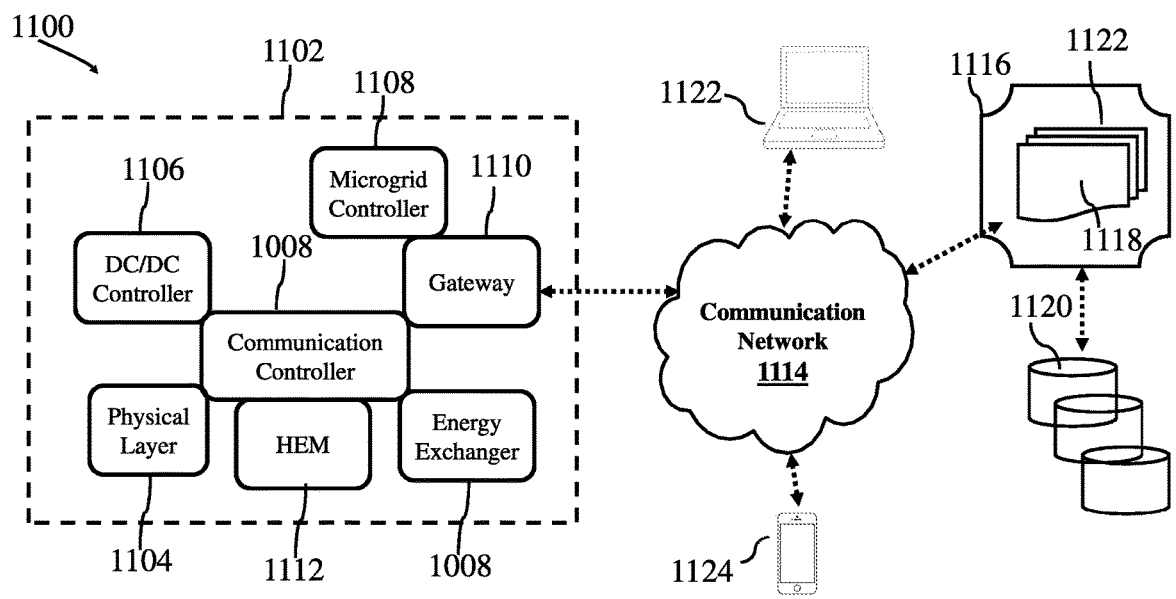
FIG. 11 is a diagram of an HVAC REMS network communication architecture, according to an embodiment of the present disclosure.

Referring to FIG. 11 a diagram 1100 of an HVAC REMS network communication architecture is shown, according to various embodiments. The network communication architecture within a residential structure 1102 comprises one or more physical exchange layer 1104, converter controller 1106, microgrid controller 1108, gateway controller 1110, home energy management system (HEM) 1112, communication network 1114 (e.g., Internet), cloud server 1116, cloud server applications 1118, and one or more database 1120. In various embodiments, the physical exchange layer 1104 comprises one or more bi-directional DD-DC converters. Communication network 1114 may comprise any one and/or the combination of the following: a direct interconnection; a Local Area Network (LAN); a wide area network (WAN); a Metropolitan Area Network (MAN); public network; the Internet; a wireless network (e.g., Bluetooth, Wi-Fi, cellular, 2G, 3G, 4G, 5G, LITE, etc.); and or the like. It is understood that any suitable network interface, network, network communication protocol, and network communication standards may be used without departing from the scope of the present teachings. In various embodiments, one or more nanogrid within residential structure 1102 comprises a DC-DC controller 1106 for handling communication with the physical layer 1104 DC-DC converter. In various embodiments, the cloud server applications 1118, including but not limited to one or more applications 1122 for storing data, measurements, visualization of power flow, debugging, maintenance, monitoring, data analysis, demand side management, power balance, power quality assurance, system protection, system optimization, and security. In various embodiments, one or more remote client device 1112, 1124 can provide access to cloud server 1116 and one or more applications 1118 for management, seamless integration, and efficient operation of DC renewable generation, DC energy storage systems, and DC smart cooling loads.

The above detailed description includes references to the accompanying drawings, which form a part of the detailed description. The drawings show, by way of illustration, specific embodiments in which the present disclosure may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

Thus, the following claims are hereby incorporated into the Detailed Description, with each claim standing on its own as a separate embodiment, and it is contemplated that such embodiments may be combined with each other in various combinations or permutations. The scope of the present disclosure should be determined with reference to the appended claims, along with the full scope of equivalents to which such claims are entitled.

What is claimed is:

1. A system for renewable energy management comprising:
    an HVAC system comprising a compressor, a motor, a blower, and a variable speed drive, wherein a power consumption of the HVAC system comprises an HVAC load;
    at least one electronic appliance, wherein a power consumption of the at least one electronic appliance comprises a non-HVAC load;
    a distributed energy resource comprising at least one solar panel;
    a voltage converter operably engaged with the distributed energy resource, the HVAC system and the at least one electronic appliance;
    a controller operably engaged with the distributed energy resource, the voltage converter, the HVAC system and the at least one electronic appliance, the controller comprising a processor and a non-transitory computer-readable medium having instructions stored thereon to cause the processor to perform one or more operations, the one or more operations comprising:
        monitoring a voltage and current output of the distributed energy resource,
        wherein monitoring the voltage and current output comprises monitoring a maximum power point tracking signal for a photovoltaic power output of the at least one solar panel;
        measuring the power consumption for the HVAC load and the non-HVAC load;

modulating a duty cycle of the voltage converter according to the voltage and current output of the distributed energy resource;

establishing a power flow between the distributed energy resource, the HVAC system and the at least one electronic appliance according to the voltage and current output of the distributed energy resource and a load priority parameter, wherein the load priority parameter is configured to prioritize the HVAC load over the non-HVAC load such that the power flow between the distributed energy resource and the at least one electronic appliance is restricted when the voltage and current output of the distributed energy resource is insufficient to satisfy both the HVAC load and the non-HVAC load;

determining, at one or more time points, whether the maximum power point tracking signal for the photovoltaic power output of the distributed energy resource is greater than or equal to a power requirement for operation of the HVAC system; and modulating, at the one or more time points, one or more components of the HVAC system according to the maximum power point tracking signal, wherein the one or more components of the HVAC system are modulated according to one or more set point in response to determining the maximum power point tracking signal is greater than or equal to the power requirement for operation of the HVAC system.

2. The system of claim 1 further comprising a distributed energy storage device comprising a nanogrid, the distributed energy storage device being operably engaged with the distributed energy resource, the voltage converter, the HVAC system and the at least one electronic appliance.

3. The system of claim 2 further comprising at least one current, voltage, or temperature sensor operably engaged with the distributed energy resource and the controller.

4. The system of claim 3 wherein the controller is configured to track a maximum power point generation of the distributed energy resource in response to an input by the at least one current, voltage, or temperature sensor.

5. The system of claim 3 wherein the at least one current, voltage, or temperature sensor comprises at least one controllable node within the nanogrid.

6. The system of claim 2 further comprising an external distributed energy storage device comprising a microgrid being operably engaged with the distributed energy storage device comprising the nanogrid.

7. The system of claim 6 wherein the one or more operations of the processor further comprise establishing a power flow between the distributed energy storage device and the HVAC system according to the voltage and current output of the distributed energy resource and the power consumption of the cooling load.

8. The system of claim 6 wherein the one or more operations of the processor further comprise establishing a power flow between the distributed energy resource and the distributed energy storage device according to the voltage and current output of the distributed energy resource and the load priority parameter.

9. The system of claim 6 wherein the one or more operations of the processor further comprise establishing a power flow between the distributed energy storage device and the external distributed energy storage device according to the voltage and current output of the distributed energy resource and the load priority parameter.

10. A method for renewable energy management comprising:

monitoring, with a controller operably engaged with at least one current, voltage, or temperature sensor, a voltage and current output of a distributed energy resource, the distributed energy resource comprising at least one solar panel, wherein monitoring the voltage and current output comprises monitoring a maximum power point tracking signal for a photovoltaic power output of the at least one solar panel;

measuring, with the controller operably engaged with the at least one current, voltage, or temperature sensor, a power consumption of an internal energy load comprising an HVAC load and a non-HVAC load, wherein the HVAC load comprises an energy load of an HVAC system and the non-HVAC load comprises an energy load of at least one electronic appliance;

modulating, with the controller, a duty cycle of a voltage converter, the voltage converter being operably engaged with the distributed energy resource and the HVAC system;

establishing, with the controller being operably engaged with the voltage converter, a power flow between the distributed energy resource, the HVAC system and the at least one electronic appliance according to the voltage and current output of the distributed energy resource, the HVAC load, and a load priority parameter;

establishing, with the controller being operably engaged with the voltage converter, a power flow between the distributed energy resource and a distributed energy storage device according to the voltage and current output of the distributed energy resource, the power consumption of the HVAC load and the load priority parameter, the distributed energy storage device comprising a nanogrid, wherein the load priority parameter is configured to prioritize the HVAC load over the non-HVAC load such that the power flow between the distributed energy resource and the at least one electronic appliance is restricted when the voltage and current output of the distributed energy resource is insufficient to satisfy both the HVAC load and the non-HVAC load;

determining, at one or more time points, whether the maximum power point tracking signal for the photovoltaic power output of the distributed energy resource is greater than or equal to a power requirement for operation of the HVAC system; and modulating, at the one or more time points, one or more components of the HVAC system according to the maximum power point tracking signal, wherein the one or more components of the HVAC system are modulated according to one or more set point in response to determining the maximum power point tracking signal is greater than or equal to the power requirement for operation of the HVAC system.

11. The method of claim 10 further comprising establishing, with the controller being operably engaged with a distributed energy storage converter, a power flow between the distributed energy storage device and the HVAC system according to the voltage and current output of the distributed energy resource and the HVAC load.

12. The method of claim 10 further comprising calculating, with the controller operably engaged with the at least one current, voltage, or temperature sensor, a maximum power point generation parameter of the distributed energy resource.

13. The method of claim 10 further comprising establishing, with the controller operably engaged with a power interface gateway, a power flow between the distributed energy storage device and an external distributed energy storage device, the external distributed energy storage device comprising a microgrid.

14. A method for renewable energy management comprising:
monitoring a maximum power point tracking signal of a distributed energy resource comprising at least one solar panel and operating within a microgrid, the microgrid comprising at least two nanogrids and a distributed energy storage system,
wherein the maximum power point tracking signal comprises a maximum photovoltaic power output of the at least one solar panel;
measuring a power consumption of an internal energy load within the at least two nanogrids, the internal energy load comprising an HVAC load and a non-HVAC load, wherein the HVAC load comprises an energy load of an HVAC system and the non-HVAC load comprises an energy load of at least one electronic appliance;
modulating a duty cycle of a voltage converter according to the internal energy load and a load priority parameter within the microgrid;
establishing a power flow between the distributed energy resource and the at least two nanogrids according to the internal energy load and the load priority parameter,
wherein the load priority parameter is configured to prioritize the HVAC load over the non-HVAC load such that the power flow between the distributed energy resource and the at least one electronic appliance is restricted when a voltage and current output of the distributed energy resource is insufficient to satisfy both the HVAC load and the non-HVAC load;
determining, at one or more time points, whether the maximum power point tracking signal for the photovoltaic power output of the distributed energy resource is greater than or equal to a power requirement for operation of the HVAC system; and
modulating, at the one or more time points, one or more components of the HVAC system according to the maximum power point tracking signal,
wherein the one or more components of the HVAC system are modulated according to one or more set point in response to determining the maximum power point tracking signal is greater than or equal to the power requirement for operation of the HVAC system.

15. The method of claim 14 further comprising establishing a power flow between the distributed energy resource and the distributed energy storage system according to the internal energy load and the load priority parameter.

16. The method of claim 14 further comprising establishing a power flow between the distributed energy storage system and the at least two nanogrids according to the internal energy load and the load priority parameter.

17. The method of claim 14 further comprising modulating the energy load of the at least one electronic appliance according to a total available power parameter of the microgrid.

* * * * *